United States Patent [19]

Linz

[11] 4,070,897
[45] Jan. 31, 1978

[54] METHOD FOR PRODUCING AN OUTER SHELL FOR OVERRUNNING CLUTCHES

[75] Inventor: Leonhard Linz, Herzogenaurach, Germany

[73] Assignee: Industriewerk Schaeffler OHG, Herzogenaurach, Germany

[21] Appl. No.: 650,292

[22] Filed: Jan. 19, 1976

[30] Foreign Application Priority Data

Feb. 4, 1975 Germany .................... 2504505

[51] Int. Cl.² ............................................. B21D 45/00
[52] U.S. Cl. ................................................... 72/345
[58] Field of Search ........................... 72/344, 345, 346

[56] References Cited

U.S. PATENT DOCUMENTS

| 440,130 | 11/1890 | Bray | 72/344 |
|---|---|---|---|
| 2,979,188 | 4/1961 | Duffield | 72/344 |
| 3,191,422 | 6/1965 | Bolt | 72/344 |
| 3,203,218 | 8/1965 | Bolt et al. | 72/344 X |

*Primary Examiner*—Leon Gilden
*Attorney, Agent, or Firm*—Hammond & Littell

[57] ABSTRACT

A novel method for producing an outer shell for an unitary overrunning roller clutch and roller bearing having a central section provided with camming or ramp surfaces about its circumference and on either side thereof a smooth cylindrical end section as a race for cylindrical rollers with the diameter of the inner enveloping circle of the central section being less in the area of the camming surfaces than the diameter of the end sections comprising forming a shell of sheet metal, inserting into the shell a molding punch whose outer contour corresponds to the desired inner contour of the outer shell, stretching the shell to its final outer diameter with a die moving relative to the punch whereby the shell tightly grips the molding punch and pulling the molding punch out of the shell which will elastically widen.

2 Claims, 4 Drawing Figures

METHOD FOR PRODUCING AN OUTER SHELL FOR OVERRUNNING CLUTCHES

STATE OF THE ART

Outer shells of this type for overrunning clutches and roller bearings are known and the diameter of the inner enveloping circuit should be less than the diameter of the adjacent races so that a cage arranged in the central region with camming surfaces and accommodating the camming rollers can be secured against rotation in a simple manner by engaging the camming surfaces. The fact that both races on either side of the central section must have a larger diameter causes manufacturing problems.

In a known shell of this type, these difficulties have been avoided in U.S. Pat. No. 3,194,368 so that only one race had a diameter larger than the inner enveloping circle in the gripping range, while the second race has a smaller diameter. However, this has the result that the two races with different diameters must be given rollers with different diameters which involves higher production costs and the risk of mixups. The manufacture of such a shell by cutting or machining would present no problems. But such a process is out of the question for cost reasons.

OBJECTS OF THE INVENTION

It is an object of the invention to provide a non-cutting method of producing an outer shell for an overrunning clutch and roller bearing in a simple economical manner.

This and other objects and advantages of the invention will become obvious from the following detailed description.

THE INVENTION

The novel method of the invention for producing an outer shell for an unitary overrunning roller clutch and roller bearing having a central section provided with camming or ramp surfaces about its circumference and on either side thereof a smooth cylindrical end section as a race for cylindrical rollers with the diameter of the inner enveloping circle of the central section being less in the area of the camming sufaces than the diameter of the end sections comprises forming a shell of sheet metal, inserting into the shell a molding punch whose outer contour corresponds to the desired inner contour of the outer shell, stretching the shell to its final outer diameter with a die moving relative to the punch whereby the shell tightly grips the molding punch and pulling the molding punch out of the shell which will elastically widen.

The starting shell may be preformed in a known manner such as by deep drawing sheet metal. A manufacturing method of this type has not been suggested before since it was believed that the shell molded with the depressions of the molding punch in the area of the camming surfaces could not be removed from the molding punch without destruction thereof or harmful deformations. However, it has been found that the method is successful and the deformations required to remove the molding punch are within the elastic range of the shell material if care is taken that the projections in the area of the camming surfaces do not exceed a certain extent. These projections can be controlled by the design since the dimensions of the molded camming surfaces can be kept very small.

The stripping of the finished shell from the molding punch can be effected in a simple manner by the die itself during its return movement relative to the punch.

Referring now to the drawings.

Figure 1:
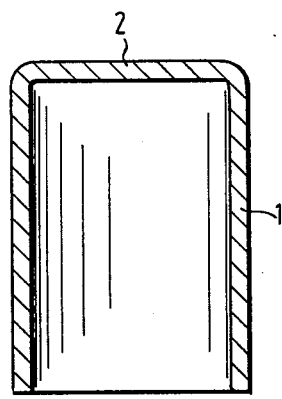
FIG. 1 is a cross-section of the preformed shell having a closed bottom.
Figure 2:
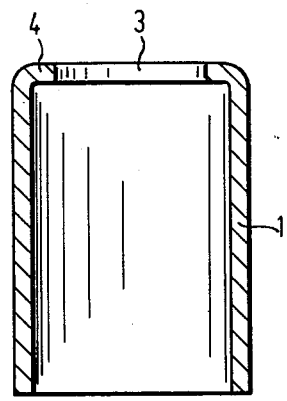
FIG. 2 is a cross-section of the shell after forming a hole in the closed bottom.
Figure 3:
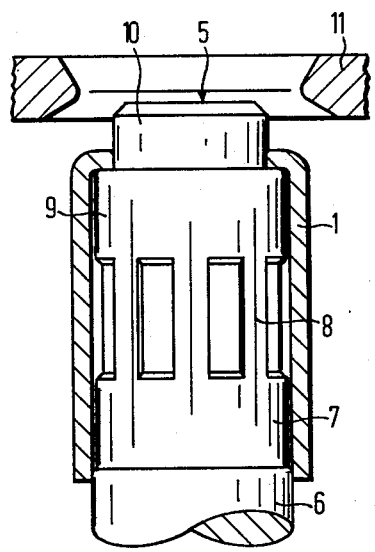
FIGS. 3 and 4 illustrate the position of the molding punch and the die before and after, respectively, stretching the shell to its final shape.

The process will now be described by reference to the drawings. First, a cylindrical shell 1 is produced, e.g. by deep drawing, which has a closed bottom 2. Then, a circular hole 3 is provided in the bottom 2 (FIG. 2) whose diameter is smaller than the bore diameter of the cylindrical shell 1, so that an edge or rim 4 remains at this end. The preshaped shell 1 is then placed on a molding punch 5 as shown in FIG. 3 which consists of punch shaft 6 which is followed by a smooth cylindrical race region 7 which is joined by a central region 8 which is provided with recesses for the formation of the camming surfaces and which is finally followed by a smooth cylindrical race region 9 which has the same diameter as the region 7. At the end of the molding punch 5 is finally provided a region 10 which is selected in its diameter so that it can engage the hole 3 on the bottom of shell 1.

Figure 4:
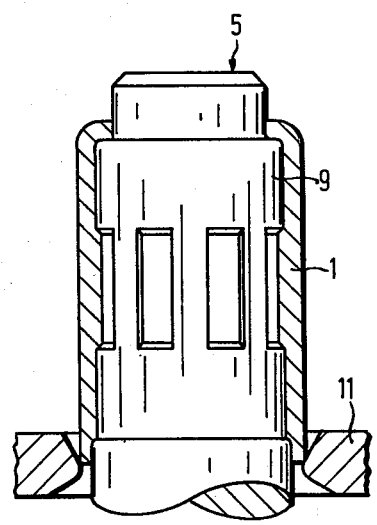

A die 11, which moves relative to the punch 5, acts with its bore on the outer shell of the shell 1 and stretches the latter with the result shown in FIG. 4. The die 11 has been brought from its top position shown in FIG. 3 into the bottom position shown in FIG. 4, and has effected the necessary deformation on shell 1. When the die 11 is moved from the bottom position shown in FIG. 4 into its upper starting position, it will strip off at the same time the finish-molded shell 1 from the molding punch 5, with the shell 1 being elastically widened in the range of its camming surfaces so that it can be removed from the top over the region 9 of the molding punch.

Various modifications of the process of the invention may be made without departing from the spirit or scope thereof and it should be understood that the invention is to be limited only as defined in the appended claims.

I claim:

1. A method for producing an outer shell for an unitary overrunning roller clutch and roller bearing having a central section provided with camming or ramp surfaces about its circumference and on either side thereof s smooth cyclindrical end section as a race for cylindrical rollers with the diameter of the inner enveloping circle of the central section being less in the area of the camming surfaces than the diameter of the end sections comprising forming a shell of sheet metal, inserting into the shell a molding punch whose outer contour corresponds to the desired inner contour of the outer shell, stretching the shell to its final outer diameter with a die moving relative to the punch whereby the shell tightly grips the molding punch provided with a central section with recesses to form camming surfaces about its circumference and with a smooth cylindrical end section on either side of the central section whose diameters are the same and are greater than the diameter of the said inner enveloping circle of the central section to thereby enable the metal of the shell to flow into the said recesses to form the camming surfaces and pulling the molding punch out of the shell which will elastically widen for removal of the punch and then return to the final outer diameter.

2. The method of claim 1 wherein die during its return movement relative to the punch strips the shell from the punch.

* * * * *